April 10, 1945. C. F. MAYER 2,373,325
WELDING ROD TRANSFER MECHANISM
Filed Feb. 12, 1941
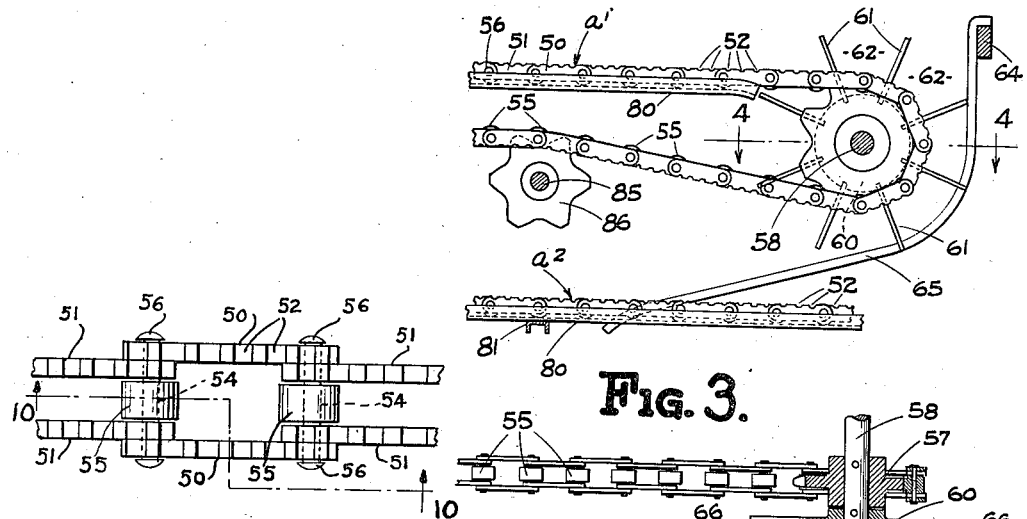
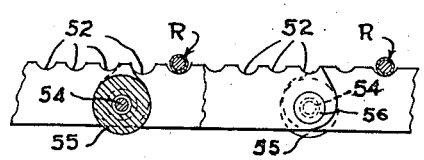
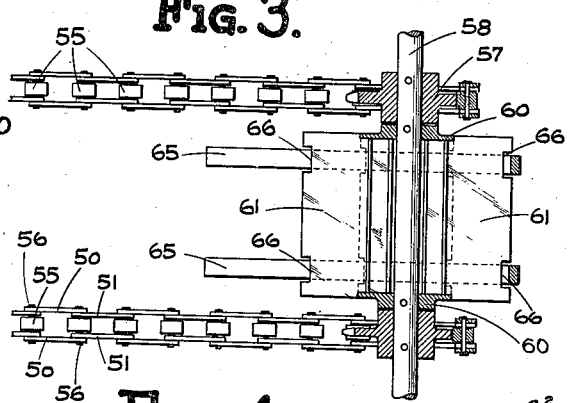
Fig. 1. Fig. 2. Fig. 3. Fig. 4. Fig. 5. Fig. 6.
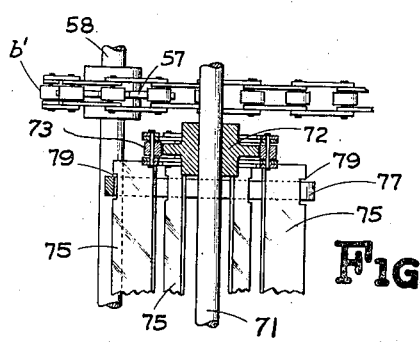
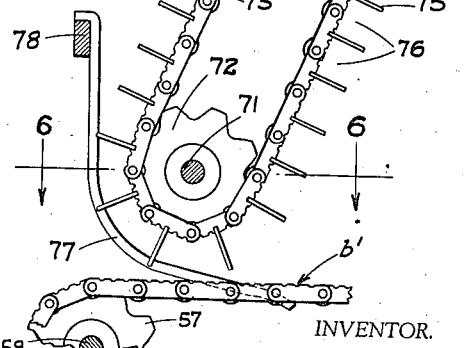
INVENTOR.
Carl F. Mayer
BY Hull, West & Chilton
ATTORNEYS.

Patented Apr. 10, 1945

2,373,325

UNITED STATES PATENT OFFICE 2,373,325

WELDING ROD TRANSFER MECHANISM

Carl F. Mayer, Lakewood, Ohio

Application February 12, 1941, Serial No. 378,581

2 Claims. (Cl. 198—25)

This invention pertains to welding rod treating and handling apparatus and more particularly to conveying means, especially suitable for use in ovens or so-called bakers of the kind employed for drying the flux coating on welding rods.

As is well known, rods of this character, in lengths ranging from 10 to 24 inches or more, are made of a metal suited to the particular kind with which they are intended for use in welding operations and are coated with flux, the rods themselves constituting the electrical conductors or electrodes and being fused in the region of the arc and merged with the metal of the object being welded, the coating of the rod supplying the flux required in the operation.

The flux, while soft and of about the consistency of putty, is applied to the rod, desirably by the extrusion process; and, when dried, the flux has approximately the solidity of commercial punk. During drying, especially during the early stages thereof, it is highly essential that the rods be handled carefully so as not to injure or disturb the flux coating and so as to effect complete drying throughout the entire area of the coating.

To this end my invention has as its main object to provide rod handling means consisting of horizontal conveyors compactly arranged in superposed relation so as to adapt said means to ovens or bakers of the above mentioned class, and to incorporate therein transfer mechanism that will speedily but gently and without injury to the coating carry the rods from the discharge end of one conveyor to the receiver end of a conveyor therebelow.

The foregoing and other objects hereinafter appearing, are attained in the embodiment of my invention illustrated in the accompanying drawing and set out in the claims appended hereto.

In the drawing, Figs. 1 and 2 are, respectively, a fragmentary plan view, and a fragmentary side elevation, partly in section, of one of the conveyor chains; Fig. 3 is a detail of the transfer means for lowering the rods from one horizontal conveyor to another similar conveyor spaced a relatively short distance therebelow; Fig. 4 is a section on the line 4—4 of Fig. 3; Fig. 5 is a detail view, similar to Fig. 3, showing the transfer means for lowering the rods from one conveyor to a second conveyor spaced a considerable distance below the first, and Fig. 6 is a section on the line 6—6 of Fig. 5.

As shown best in Figs. 1 and 2, the conveyor chain is composed of identical outer links 50, and inner links 51, the latter being identical with respect to one another but differing slightly from links 50. Each link is provided along what may be regarded its outer edge with a series of rod seats 52. The links have apertures adjacent their ends and, in fabricating the chain, pairs of inner links are alternated with pairs of outer links and are overlapped to align the apertures of adjacent links. Pins 54, with rollers 55 mounted thereon, have their ends extended through the apertures of adjacent links and provided therebeyond with abutments or heads 56, the heads being spaced far enough apart to insure freedom of movement of the links and the rollers about the pins. As will be observed from Fig. 2, the rollers extend beyond the plane of the inner edges of the links. At the ends of the conveyors the chains are engaged about sprocket wheels 57, 57ª (Figs. 3 to 6) that are mounted on shafts 58, 58ª.

I shall now describe the transfer means for shifting the welding rods R (Fig. 2) from the upper conveyor $a^1$ to the lower conveyor $a^2$, reference being had particularly to Figs. 3 and 4. Considering the discharge or right hand end of the upper conveyor $a^1$, disk-like members 60 are mounted on a shaft 58 inwardly of sprockets 57 about which the conveyor chains are engaged, and said members carry radial fins 61 that extend a greater distance from the axis of the shaft 58 than the rod seats 52 of the chain links when said links pass about the adjacent sprocket wheels 57. Thus it will be seen that the members 60 and fins 61 make up a cylindrical structure having the appearance of a paddle wheel that is supported by the shaft 58 between the opposed chains of the conveyor under consideration and spaced about the circumference of which, between the fins 61, are what may be termed rod pockets 62. Suitably supported in association with said conveyor, as by a cross bar 64, are curved guides 65 that follow the contour of the adjacent cylindrical structure downwardly and under the same, and the free ends of the guides gradually descend below the plane of the top flight of the conveyor next below. To provide clearance for the guides 65, the fins 61 are provided with notches 66. As a consequence of the foregoing arrangement, a welding rod, being carried about the discharge end of the conveyor, drops by gravity from the rod seats 52 onto the adjacent fin 61 and is conveyed downwardly thereby. As soon as said fin descends below a horizontal position the rod coasts against the guides 65 and is sustained thereby as it is carried down by the fin and when released by the latter descends along the guides until gently deposited thereby upon the top flight of the conveyor below where it assumes a position within the corresponding rod seats of the opposed chains of said conveyor. Should any of the rods become disarranged from any cause and lie in other than right angular relation to the chains of the conveyors, they are automatically returned to a position transversely of the conveyors by the transfer means, as is obvious from the foregoing.

Associated with the left hand end of the conveyor $a^2$ and the corresponding end of the oppositely moving conveyor $b'$ is transfer means which I shall now describe and which is shown in detail in Figs. 5 and 6. This transfer means also serves to return to proper transverse position on the conveyors any rods that are awry.

Sprocket wheels 57ª, about which the chains at the discharge end of the conveyor now under consideration are engaged, are fastened to a shaft 58ª. Secured to said shaft, inwardly of said sprocket wheels, are similar wheels 70. Suitably supported below the shaft 58ª in parallel relation thereto and to one side of its vertical plane, is a shaft 71 by which are carried sprocket wheels 72 that are in the planes of the former wheels 70. Engaged about each sprocket wheel 70 and the corresponding sprocket wheel 72 is an endless chain 73, and carried by the links of the two chains 73 are fins 75, said fins being spaced apart about the same distance as the fins 61 of the previously described transfer means. Thus, rod pockets 76 are provided between adjacent fins 75 in which the rods are carried downward from the discharge end of the present conveyor, and as the fins, moving about the lower sprocket wheels 72, descend below horizontal position, the rods gravitate against guides 77, similar to the previously mentioned guides 65. The present guides are supported by a cross bar 78. The welding rods, when released by the fins 75, coast down and off the guides to find seats on the conveyor below. The fins 75 have notches 79 to provide clearance for the guides 77.

Having thus described my invention, what I claim is:

1. A welding rod conveyor and transfer means comprising two sprocket wheels spaced laterally one from the other and supported for rotation on the same axis, conveyor chains, one engaged about each sprocket, each chain having closely spaced well defined rod seats consisting of notches in the links of the chain and that are substantially in transverse alignment with those of the other chain, rod conveying means below said conveyor chains, and a cylindrical structure supported for rotation between said sprocket wheels and on the same axis and including circumferentially spaced rod pockets, said pockets extending substantially from one sprocket wheel to the other and each having the capacity to accommodate several rods, and guide means extending downwardly and under the cylindrical structure, the lower portion of the guide means being inclined gradually downwardly to the horizontal and descending to substantially the plane of the rod supporting parts of the said rod conveying means.

2. A welding rod conveyor and transfer means comprising two sprocket wheels spaced laterally one from the other and supported for rotation on the same axis, conveyor chains, one engaged about each sprocket, each chain having closely spaced well defined rod seats substantially in transverse alignment with those of the other chain, rod conveying means below said conveyor chains, and a cylindrical structure supported for rotation between said sprocket wheels and on the same axis and including disk-like end members and fins spaced a substantial distance apart circumferentially thereof and disposed longitudinally of said structure, said fins extending outwardly beyond the plane of the rod seats of the conveyor chains as the latter pass about said sprocket wheels, the spaces between adjacent fins serving as rod pockets, each having the capacity to accommodate several rods, and guides spaced radially beyond the plane of the rod pockets of the conveyor chains where said chains pass downwardly and under the sprockets, the outer edges of the fins being notched to provide clearance for said guides, and the lower end portions of the guides being inclined slightly to the horizontal and descending below the rod supporting parts of the said rod conveying means.

CARL F. MAYER.